(12) United States Patent
Bolognese et al.

(10) Patent No.: US 10,979,517 B2
(45) Date of Patent: *Apr. 13, 2021

(54) GEO-ENRICHMENT OF DATA BASED ON SHAPES

(71) Applicant: SAP SE, Walldorf (DE)

(72) Inventors: Christopher Bolognese, Vancouver (CA); Jonathan Tiu, Surrey (CA); Xing Jin, Vancouver (CA); Sae-Won Om, Burnaby (CA); Lyndon Hiew, Richmond (CA)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,075

(22) Filed: Dec. 23, 2019

(65) Prior Publication Data

US 2020/0137179 A1  Apr. 30, 2020

Related U.S. Application Data

(63) Continuation of application No. 15/394,178, filed on Dec. 29, 2016, now Pat. No. 10,554,766.

(51) Int. Cl.
*G06F 16/29* (2019.01)
*H04L 29/08* (2006.01)

(52) U.S. Cl.
CPC .............. *H04L 67/18* (2013.01); *G06F 16/29* (2019.01); *H04L 67/08* (2013.01); *H04L 67/1097* (2013.01); *H04L 67/32* (2013.01)

(58) Field of Classification Search
CPC ......... H04L 67/18; H04L 67/08; H04L 67/32; H04L 67/1097; G06F 16/29
See application file for complete search history.

(56) References Cited

U.S. PATENT DOCUMENTS

| | | | |
|---|---|---|---|
| 6,985,929 B1 | 1/2006 | Wilson et al. | |
| 9,430,858 B1 * | 8/2016 | Har | G01C 21/32 |
| 9,898,763 B1 | 2/2018 | Vaynblat et al. | |
| 2005/0270311 A1 | 12/2005 | Rasmussen et al. | |
| 2007/0146374 A1 * | 6/2007 | Riise | G06F 16/9537 345/505 |
| 2009/0132469 A1 * | 5/2009 | White | G06Q 10/00 |
| 2014/0256355 A1 * | 9/2014 | Harris | H04W 4/18 455/456.3 |
| 2015/0006517 A1 | 1/2015 | McDougall et al. | |
| 2015/0205838 A1 | 7/2015 | Statchuk | |
| 2018/0189322 A1 | 7/2018 | Ksadi et al. | |

* cited by examiner

*Primary Examiner* — Chris Parry
*Assistant Examiner* — Steven C Nguyen
(74) *Attorney, Agent, or Firm* — Fountainhead Law Group P.C.

(57) ABSTRACT

Some embodiments provide a non-transitory machine-readable medium that stores a program. The program receives a request to geo-enrich data comprising a set of location data. The program further accesses shape data comprising a plurality of shapes associated with a plurality of geographical regions. The program also associates, for each location data in the set of location data, a shape in the plurality of shape with the location data.

20 Claims, 16 Drawing Sheets

| Area ID | Area Name | Parent Area ID | Level | Shape | Reference Point |
|---|---|---|---|---|---|
| 9412 | California | 5443 | 2 | Shape 1 | RP 1 |
| 1122 | Los Angeles | 9412 | 3 | Shape 2 | RP 2 |
| 5443 | Orange | 9412 | 3 | Shape 3 | RP 3 |
| 4913 | Santa Clara | 9412 | 3 | Shape 4 | RP 4 |
| 5719 | Florida | 5443 | 2 | Shape 5 | RP 5 |
| 1212 | Collier | 5719 | 3 | Shape 6 | RP 6 |
| 8312 | Orange | 5719 | 3 | Shape 7 | RP 7 |
| 1122 | Palm Beach | 5719 | 3 | Shape 8 | RP 8 |
| 8543 | USA | 0 | 1 | Shape 9 | RP 9 |
| 5312 | Canada | | 1 | Shape 10 | RP 10 |
| 2321 | Nevada | 5443 | 2 | Shape 11 | RP 11 |
| 7655 | Oregon | 5443 | 2 | Shape 12 | RP 12 |
| 7821 | Arizona | 5443 | 2 | Shape 13 | RP 13 |
| 1231 | Cochise | 7821 | 3 | Shape 14 | RP 14 |

FIG. 2

| ID | MyState |
|---|---|
| 1 | Arizona |
| 2 | California |
| 3 | Florida |
| 4 | Nevada |
| 5 | Oregon |

| ID | MyState | State | State RP |
|----|---------|-------|----------|
| 1 | Arizona | 7821 | RP 13 |
| 2 | California | 9412 | RP 1 |
| 3 | Florida | 5719 | RP 5 |
| 4 | Nevada | 2321 | RP 11 |
| 5 | Oregon | 7655 | RP 12 |

405

| ID | MyState | State | State RP |
|----|---------|-------|----------|
| 1 | Arizona | 7821 | RP 13 |
| 2 | California | 9412 | RP 1 |
| 3 | Florida | 5719 | RP 5 |
| 4 | Nevada | 2321 | RP 11 |
| 5 | Oregon | 7655 | RP 12 |

| ID | MyState | MyCounty |
|---|---|---|
| 1 | California | Los Angeles |
| 2 | California | Orange |
| 3 | California | Santa Clara |
| 4 | Florida | Collier |
| 5 | Florida | Orange |
| 6 | Florida | Palm Beach |

Table 600:

| ID | MyState | MyCounty | State | State RP | County | County RP |
|---|---|---|---|---|---|---|
| 1 | California | Los Angeles | 9412 | RP 1 | 1122 | RP 2 |
| 2 | California | Orange | 9412 | RP 1 | 5443 | RP 3 |
| 3 | California | Santa Clara | 9412 | RP 1 | 4913 | RP 4 |
| 4 | Florida | Collier | 5719 | RP 5 | 1212 | RP 6 |
| 5 | Florida | Orange | 5719 | RP 5 | 8312 | RP 7 |
| 6 | Florida | Palm Beach | 5719 | RP 5 | 1122 | RP 8 |

Table 605:

| ID | MyState | State | State RP |
|---|---|---|---|
| 1 | California | 9412 | RP 1 |
| 2 | California | 9412 | RP 1 |
| 3 | California | 9412 | RP 1 |
| 4 | Florida | 5719 | RP 5 |
| 5 | Florida | 5719 | RP 5 |
| 6 | Florida | 5719 | RP 5 |

Table 610:

| ID | MyCounty | County | County RP |
|---|---|---|---|
| 1 | Los Angeles | 1122 | RP 2 |
| 2 | Orange | 5443 | RP 3 |
| 3 | Santa Clara | 4913 | RP 4 |
| 4 | Collier | 1212 | RP 6 |
| 5 | Orange | 8312 | RP 7 |
| 6 | Palm Beach | 1122 | RP 8 |

FIG. 6

| ID | MyCountry | MyCounty |
|----|-----------|-------------|
| 1  | USA       | Collier     |
| 2  | USA       | Orange      |
| 3  | USA       | Palm Beach  |
| 4  | USA       | Santa Clara |

| County | Store Sales |
|---|---|
| Santa Clara | 34564 |
| Los Angeles | 67544 |
| Orange | 27349 |
| Cochise | 11834 |

| County | Store Sales |
|---|---|
| Santa Clara | 34564 |
| Los Angeles | 67544 |

| County | Store Sales |
|---|---|
| Cochise | 11834 |

GEO-ENRICHMENT OF DATA BASED ON SHAPES

CROSS-REFERENCE TO RELATED APPLICATION

This application is a continuation of U.S. patent application Ser. No. 15/394,178, filed Dec. 29, 2016. The entire contents of U.S. patent application Ser. No. 15/394,178 is incorporated herein by reference in its entirety for all purposes.

BACKGROUND

Many computing systems and computing devices generate and store an increasing amount of data. Much of such data may include data that describes a location (e.g., an address, a city, a state, a country, a postal zip code, etc.). Some computing systems may perform geocoding operations on such data to determine a location on the surface of the Earth associated with the described location. Geocoded data may be useful in some aspects and/or application. For example, the geocoded data may be used for mapping purposes, business intelligence, spatial analysis, etc.

SUMMARY

In some embodiments, a non-transitory machine-readable medium stores a program. The program receives a request to geo-enrich data comprising a set of location data. The program further accesses shape data comprising a plurality of shapes associated with a plurality of geographical regions. The program also associates, for each location data in the set of location data, a shape in the plurality of shape with the location data.

In some embodiments, the program may further generate a spatial data table comprising the set of location data and the shapes associated with the set of location data. The set of location data may include a first location attribute and a second location attribute. The associating may include associating, for each location data in the set of location data, a shape in the plurality of shapes with the first attribute of the location data. The program may further associate, for each location data in the set of location data, a shape in the plurality of shapes with the second location attribute of the location data. The program may further generate a first view that includes the first location attribute of the set of location data and the shapes associated with the first location attribute of the set of location data. The program may also generate a second view that includes the second location attribute of the set of location data and the shapes associated with the second location attribute of the set of location data.

In some embodiments, the shape data may further include a plurality of reference points associated with the plurality of shapes. The program may further determine, for each shape in the plurality of shapes, the reference point associated with the shape by calculating a centroid of the shape; using the centroid of the shape as the reference point associated with the shape upon determining that the centroid is contained in the shape; and using a point within the shape as the reference point associated with the shape upon determining that the centroid is not contained in the shape. Determining, for each shape in the plurality of shapes, the reference point associated with the shape may be by further, upon determining that the shape comprises a plurality of polygons, identifying a polygon in the plurality of polygons having a largest area. Calculating the centroid of the shape may include calculating the centroid of the polygon. Using the centroid of the shape as the reference point associated with the shape may include using the centroid of the shape as the reference point associated with the shape upon determining that the centroid is contained in the polygon. Using the point within the shape as the reference point associated with the shape may include using the point within the shape as the reference point associated with the shape upon determining that the centroid is not contained in the polygon.

In some embodiments, a method receives a request to geo-enrich data comprising a set of location data. The method further accesses shape data comprising a plurality of shapes associated with a plurality of geographical regions. The method also associates, for each location data in the set of location data, a shape in the plurality of shape with the location data.

In some embodiments, the method may further generate a spatial data table comprising the set of location data and the shapes associated with the set of location data. The set of location data may include a first location attribute and a second location attribute. The associating may include associating, for each location data in the set of location data, a shape in the plurality of shapes with the first attribute of the location data. The method may further associate, for each location data in the set of location data, a shape in the plurality of shapes with the second location attribute of the location data. The method may further generate a first view that includes the first location attribute of the set of location data and the shapes associated with the first location attribute of the set of location data. The method may also generate a second view that includes the second location attribute of the set of location data and the shapes associated with the second location attribute of the set of location data.

In some embodiments, the shape data may further include a plurality of reference points associated with the plurality of shapes. The method may further determine, for each shape in the plurality of shapes, the reference point associated with the shape by calculating a centroid of the shape; using the centroid of the shape as the reference point associated with the shape upon determining that the centroid is contained in the shape; and using a point within the shape as the reference point associated with the shape upon determining that the centroid is not contained in the shape. Determining, for each shape in the plurality of shapes, the reference point associated with the shape may be by further, upon determining that the shape comprises a plurality of polygons, identifying a polygon in the plurality of polygons having a largest area. Calculating the centroid of the shape may include calculating the centroid of the polygon. Using the centroid of the shape as the reference point associated with the shape may include using the centroid of the shape as the reference point associated with the shape upon determining that the centroid is contained in the polygon. Using the point within the shape as the reference point associated with the shape may include using the point within the shape as the reference point associated with the shape upon determining that the centroid is not contained in the polygon.

In some embodiments, a system includes a set of processing units and a non-transitory computer-readable medium storing instructions. The instructions cause at least one processing unit to receive a request to geo-enrich data comprising a set of location data. The instructions further cause the at least one processing unit to access shape data comprising a plurality of shapes associated with a plurality of geographical regions. The instructions also cause the at least one processing unit to associate, for each location data in the set of location data, a shape in the plurality of shape with the location data.

In some embodiments, the instructions may further cause the at least one processing unit to generate a spatial data table comprising the set of location data and the shapes associated with the set of location data. The set of location data may include a first location attribute and a second location attribute. The associating may include associating, for each location data in the set of location data, a shape in the plurality of shapes with the first attribute of the location data. The instructions may further cause the at least one processing unit to associate, for each location data in the set of location data, a shape in the plurality of shapes with the second location attribute of the location data. The instructions may further cause the at least one processing unit to generate a first view that includes the first location attribute of the set of location data and the shapes associated with the first location attribute of the set of location data. The instructions may also cause the at least one processing unit to generate a second view that includes the second location attribute of the set of location data and the shapes associated with the second location attribute of the set of location data.

In some embodiments, the shape data may further include a plurality of reference points associated with the plurality of shapes. The instructions further cause the at least one processing unit to determine, for each shape in the plurality of shapes, the reference point associated with the shape by calculating a centroid of the shape; using the centroid of the shape as the reference point associated with the shape upon determining that the centroid is contained in the shape; and using a point within the shape as the reference point associated with the shape upon determining that the centroid is not contained in the shape. Determining, for each shape in the plurality of shapes, the reference point associated with the shape may be by further, upon determining that the shape comprises a plurality of polygons, identifying a polygon in the plurality of polygons having a largest area. Calculating the centroid of the shape may include calculating the centroid of the polygon. Using the centroid of the shape as the reference point associated with the shape may include using the centroid of the shape as the reference point associated with the shape upon determining that the centroid is contained in the polygon. Using the point within the shape as the reference point associated with the shape may include using the point within the shape as the reference point associated with the shape upon determining that the centroid is not contained in the polygon.

The following detailed description and accompanying drawings provide a better understanding of the nature and advantages of the present invention.

BRIEF DESCRIPTION OF THE DRAWINGS

FIG. 2 illustrates example shape data according to some embodiments.

FIG. 3 illustrates example data that includes area-based location data with one attribute according to some embodiments.

FIG. 4 illustrates geo-enrichment of the data illustrated in FIG. 3 based on shapes according to some embodiments.

FIG. 5 illustrates example data that includes area-based location data with two adjacent attributes according to some embodiments.

FIG. 6 illustrates geo-enrichment of the data illustrated in FIG. 5 based on shapes according to some embodiments.

FIG. 7 illustrates example data that includes area-based location data with two non-adjacent attributes according to some embodiments.

DETAILED DESCRIPTION

Figure 1:
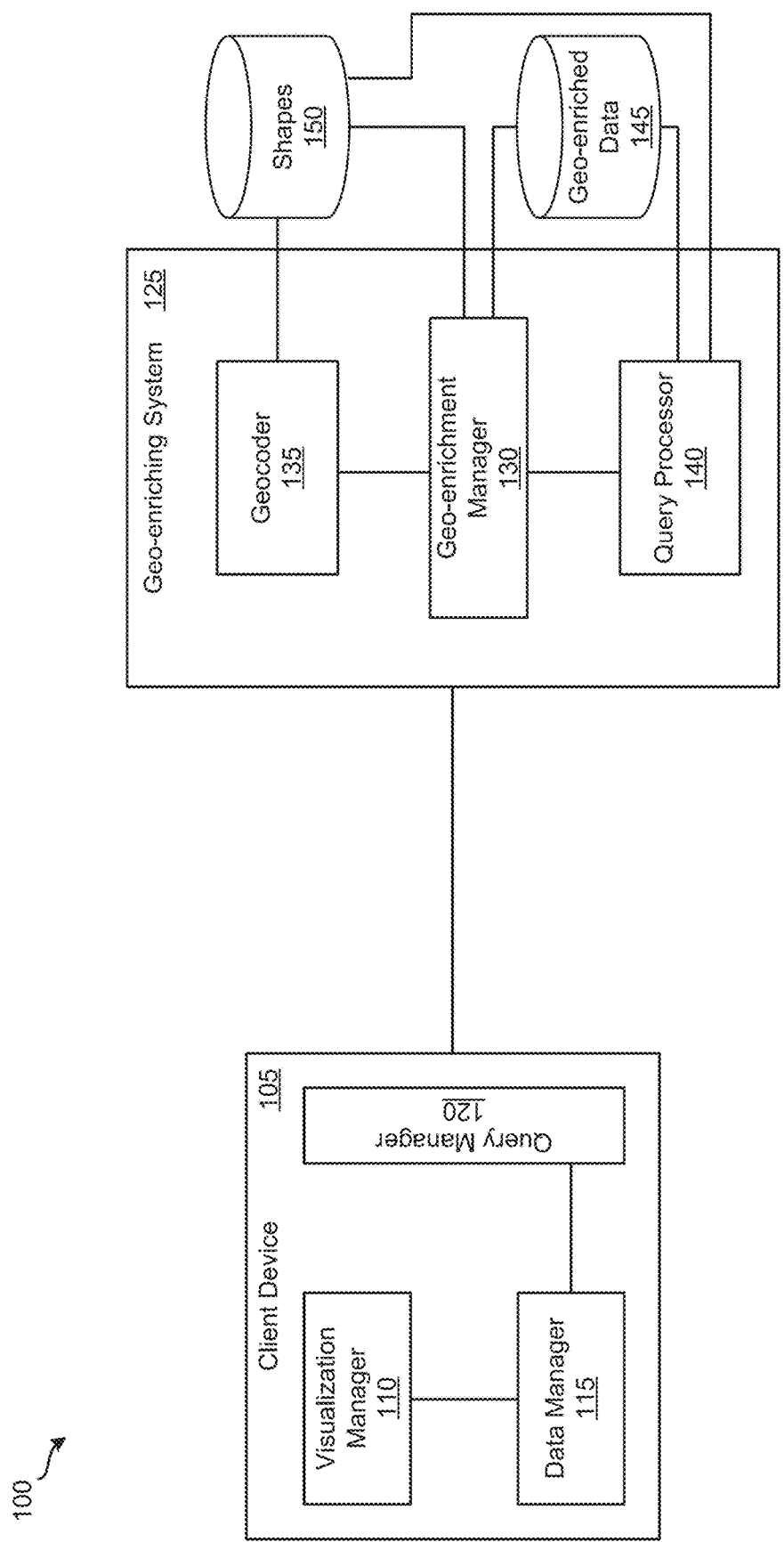
FIG. 1 illustrates a system according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for geo-enriching data based on shapes. In some embodiments, a client device may send a geo-enriching system a request to geo-enrich data that includes area-based location data. The geo-enriching system manages shape data associated with geographical regions, such as countries, states, counties, cities, etc. In some embodiments, the geo-enriching system geo-enriches the location data by determining the shapes in the shape data associated with the location data and then generating a spatial data table that includes the location data and references to the shapes associated with the location data. When the geo-enriching system receives from the client device a query for geo-enriched data, the geo-enriching system uses the references to the shapes to return the shapes along with the geo-enriched data specified in the query.

In some embodiments, geo-enriching data is associating non-location data with spatial data. For instance, data that includes non-location and location data associated with the non-location data may be geo-enriched by geocoding the location data. In some embodiments, geocoding location data is converting the location data to spatial data. In some embodiments, location data is data that describes a location, area, region, or combination thereof (e.g., a location, area, region, or combination thereof on Earth). Examples of location data may include address data, city data, state data, country data, postal zip code data, latitude and longitude data, etc., or a combination of any number of different types of location data (e.g., address data and city data, city data and state data, address data, etc.). In some embodiments, location data is textual data.

Spatial data may be data that defines the shape, size, position, and/or orientation of a geometry (e.g., a point, a line, an area, a region, or any combination thereof) in a defined space (e.g., the surface of the Earth). In some embodiments, a defined space in which geometries are defined is referred to as a spatial reference system (SRS). A particular defined space may be associated with a unique identifier referred to as a spatial reference identifier (SRID). Spatial data may be represented using a particular spatial data type (e.g., a point represented as an ST_point, a line represented as an ST_curve or ST_polyline, an area represented as an ST_polygon, ST_multipolygon, etc.). Spatial operations may be performed on spatial data such as calculating the intersection of spatial data (e.g., intersection of two polygons), determining whether spatial data (e.g., a point, a line, a polygon, or any combination thereof) is contained within another spatial data (e.g., a polygon), determining whether spatial data (e.g., a point, a line, a polygon, or any combination thereof) is within a specified distance of another spatial data (e.g., a polygon), determining whether spatial data (e.g., a point, a line, a polygon, or any combination thereof) is within a specified distance of another spatial data (e.g., a polygon), etc.

In some embodiments, a spatial visualization is a visualization that illustrates relationships among elements in a defined space. An example of a spatial visualization is a map visualization. In some embodiments, a non-spatial visualization is a visualization that does not depict relationships among elements in a defined space. Examples of non-spatial visualizations include charts, graphs, tables, etc.

FIG. 1 illustrates a system 100 according to some embodiments. As shown, system 100 includes client device 105, geo-enriching system 125, geo-enriched data storage 145, and shapes storage 150. Geo-enriched data storage 145 is configured to store data that has been geo-enriched by geo-enriching system 125. Shapes storage 150 is configured to store definitions of shapes. Storages 145 and 150 may each be a relational database or a non-relational database managed by a database management system (DBMS) application (not shown) that operates on geo-enriching system 125. In some embodiments, storages 145 and 150 are implemented in a single physical storage while, in other embodiments, storages 145 and 150 may be implemented across several physical storages. While FIG. 1 shows storages 145 and 150 as external to geo-enriching system 125, one of ordinary skill in the art will appreciated that storages 145 and/or 150 may be included in geo-enriching system 125 in some embodiments.

As shown in FIG. 1, geo-enriching system 125 includes geo-enrichment manager 130, geocoder 135, and query processor 140. Geo-enrichment manager 130 is responsible for handling requests from client device 105 to geo-enrich data. In some embodiments, geo-enrichment manager 130 may receive from client device 105 a request to geo-enrich data and the data to geo-enrich. In other embodiments, geo-enrichment manager 130 may receive from client device 105 a request to geo-enrich data and a data source that includes data to geo-enrich. In some such other embodiments, geo-enrichment manager 130 accesses the data source and retrieves the data to geo-enrich from the data source. In some embodiments, geo-enrichment manager 130 may receive from client device 105 data to be geo-enriched and a data source that includes data to geo-enrich along with a request to geo-enrich the data and the data in the data source.

As mentioned above, in some embodiments, the data to be geo-enriched includes non-location data and location data. In some such embodiments, the request to geo-enrich data may specify that the type of location data is area-based location data (e.g., country data, state data, county data, city data, etc.), etc.). For requests received with a data source, geo-enrichment manager 130 retrieves the data from the data source and then sends it to geocoder 135 to geo-enrich the data. For requests received with the data itself, geo-enrichment manager 130 sends the data to geocoder 135 to geo-enrich the data. When geo-enrichment manager 130 receives the geo-enriched data from geocoder 135, geo-enrichment manager 130 stores the geo-enriched data in geo-enriched data storage 145.

Geo-enrichment manager 130 can also handle queries from client device 105 for geo-enriched data. When geo-enrichment manager 130 receives such a query from client device, geo-enrichment manager 130 sends the query to query processor 140 for processing. In return, geo-enrichment manager 130 receives results for the query from query processor 140. Geo-enrichment manager 130 then sends the results for the query to client device 105.

Geocoder 135 is configured to geo-enrich location data. Geocoder 135 may receive from geo-enrichment manager 130 data that includes location data and a request to geo-enrich the location data. As mentioned above, the request to geo-enrich data may specify that the type of location data is area-based location data in some embodiments. In some embodiments geocoder 135 geo-enriches location data based on shape data associated with geographical regions stored in shapes storage 150. FIG. 2 illustrates example shape data according to some embodiments. As shown, FIG. 2 illustrates a table 200 that includes an Area ID attribute, an Area Name attribute, a Parent Area ID attribute, a Level attribute, a Shape attribute, and a Reference Point attribute. The Area ID attribute is for storing an identifier for identifying a data record in table 200. The Area Name attribute is for storing a name of a geographical region with which a shape is associated. In some embodiments, shape data may be organized in one or more hierarchies that include a defined number of levels. In some such embodiments, such a hierarchy may include two or more of the following levels from top to bottom: country, region, subregion 1, subregion 2, and subregion 3. As such, the Parent Area ID attribute is for storing an identifier of a parent shape of the shape based on the one or more hierarchies. The shape data in table 200 is based on a hierarchy that includes the following levels from top to bottom: country, state, county, and city. The Level attribute is for storing a level in the hierarchy with which the shape is associated. The Shape attribute is for storing spatial data (e.g., an ST_polygon, an ST_multipolygon, etc.) that defines the shape associated with the geographical region. The Reference Point attribute is for storing a spatial data (e.g., an ST_point) that defines a point in the shape associated with the geographical region.

In some embodiments, geo-enrichment manager 130 may determine a point in a shape associated with a geographical region for the Reference Point attribute. For instance, geo-enrichment manager 130 can determine whether the spatial data defining the shape associated with the geographical region is a polygon or a multipolygon (e.g., a set of polygons). If the shape is a polygon, geo-enrichment manager 130 determines a centroid of the polygon and then determines whether the centroid is within the polygon. If so, geo-enrichment manager 130 determines the centroid as the point in the shape for the Reference Point attribute. Otherwise, geo-enrichment manager 130 selects a random point in the polygon as the point in the shape for the Reference Point attribute. If the shape is a multipolygon, geo-enrichment manager 130 selects the polygon in the multipolygon having the largest area. Next, geo-enrichment manager 130 determines a centroid of the selected polygon and then determines whether the centroid is within the selected polygon. If so, geo-enrichment manager 130 determines the centroid of the selected polygon as the point in the shape for the Reference Point attribute. Otherwise, geo-enrichment manager 130 selects a random point in the selected polygon as the point in the shape for the Reference Point attribute.

Returning to FIG. 1, as mentioned above, geocoder 135 geo-enriches location data based on shape data associated with geographical regions stored in shapes storage 150. When geocoder 135 receives data that includes location data from geo-enrichment manager 130, geocoder 135 determines the number of location data attributes to geo-enrich. In some embodiments, the request to geo-enrich data may specify the level in the hierarchy associated with each location data attribute. If the determined number of location data attributes is one, geocoder 135 determines the level of the location data attribute and then queries for the shape data stored in shapes storage 150 for shapes associated with the location data in a manner described by the following example. Once geocoder 135 geo-enriches the location data, geocoder sends the geo-enriched location data to geo-enrichment manager 130.

An example geo-enrichment operation for location data with one attribute will now be described by reference to FIGS. 3 and 4. FIG. 3 illustrates example data 300 that includes area-based location data with one attribute according to some embodiments. As shown data 300 includes an ID attribute for storing an identifier for identifying a data record in data 300 and a MyState attribute for storing a name of a geographical state region. In addition, data 300 includes five data records: a first data record that specifies a state of Arizona, a second data record that specifies a state of California, a third data record that specifies a state of Florida, a fourth data record that specifies a state of Nevada, and a fifth data record that specifies a state of Oregon. In this example the request to geo-enrich data specifies the level in the hierarchy associated with the MyState location data attribute is two, which corresponds to the state level in the hierarchy used for the shape data in table 200.

FIG. 4 illustrates geo-enrichment of the data illustrated in FIG. 3 based on shapes according to some embodiments. As shown, FIG. 4 illustrates table 400 and view 405. View 405 may be part of a data model. In some embodiments, a data model is defined as one or more views and one or more tables associated with the one or more views. A view can be a filter associated with one or more tables that provides access to one or more attributes (e.g., columns) of the one or more tables. Alternatively or in addition, a view may provide access to data calculated based on and/or derived from one or more attributes of the one or more tables. In some instances, a view can be a filter associated with one or more views and/or tables that provides access to one or more attributes of the one or more views and/or tables.

As illustrated, Table 400 includes the ID attribute and the MyState attribute shown in data 300. Table 400 also includes a State attribute for storing an area ID of a shape associated with a geographical state region and a State Reference Point attribute for storing a point in the shape associated with the shape. View 405 is a filter associated with table 400 that provides access to the MyState, the State, and the State Reference Point attributes in table 400. In this example, geocoder 135 geo-enriches a data record of data 300 by querying for the Area ID and Reference Point from table 200 where the value of the Area Name attribute in table 200 and the value of the MyState attribute of the data record are the same and where the value of the Level attribute in table 200 is two.

Returning to FIG. 1, if geocoder 135 determines that the number of location data attributes is more than one, geocoder 135 determines whether the levels of the location data attributes are adjacent to each other. If so, then geocoder 135 queries the shape data stored in shapes storage 150 for shapes associated with the location data in a manner described by the following example. Once geocoder 135 geo-enriches the location data, geocoder sends the geo-enriched location data to geo-enrichment manager 130.

An example geo-enrichment operation for location data with two adjacent attributes will now be described by reference to FIGS. 5 and 6. FIG. 5 illustrates example data 500 that includes area-based location data with two adjacent attributes according to some embodiments. As shown data 500 includes an ID attribute for storing an identifier for identifying a data record in data 500, a MyState attribute for storing a name of a geographical state region, and a MyCounty attribute for storing a name of a county in the geographical state region. Additionally, data 500 includes six data records: a first data record that specifies a state of California and a county of Los Angeles, a second data record that specifies a state of California and a county of Orange, a third data record that specifies a state of California and a county of Santa Clara, a fourth data record that specifies a state of Florida and a county of Collier, a fifth data record that specifies a state of Florida and a county of Orange, and a sixth data record that specifies a state of Florida and a county of Palm Beach. In this example the request to geo-enrich data specifies the levels in the hierarchy associated with the MyState location data attribute and the MyCounty location data attribute are two and three, respectively, which correspond to the adjacent state and county levels in the hierarchy used for the shape data in table 200.

FIG. 6 illustrates geo-enrichment of the data illustrated in FIG. 5 based on shapes according to some embodiments. As shown, FIG. 6 illustrates table 600, view 605, and view 610. Views 605 and 610 may be part of a data model. As illustrated, Table 600 includes the ID attribute, the MyState attribute, and the MyCounty attribute shown in data 500. Table 600 also includes a State attribute for storing an area ID of a shape associated with a geographical state region, a State Reference Point attribute for storing a point in the shape associated with the geographical state region, a County attribute for storing an area ID of a shape associated with a geographical county region, and a County Reference Point attribute for storing a point in the shape associated with the geographical county region. View 605 is a filter associated with table 600 that provides access to the MyState, the State, and the State Reference Point attributes in table 600. View 610 is a filter associated with table 600 that provides access to the MyCounty, the County, and the County Reference Point attributes in table 600.

In this example, geocoder 135 geo-enriches a data record of data 500 by performing a first query for the Area ID, the Parent Area ID, and the Reference Point from table 200 where the value of the Area Name attribute in table 200 and the value of the MyCounty attribute of the data record are the same or similar and where the value of the Level attribute in table 200 is three. Then, geocoder 135 performs a second query for the Area ID, the Parent Area ID, and the Reference Point from table 200 where the value of the Area Name attribute in table 200 and the value of the MyState attribute of the data record are the same or similar, where the value of the Area ID attribute in table 200 and the value of the Parent ID from a record in the results of the first query are the same, and where the value of the Level attribute in table 200 is two. If the second query returns results that are not empty or null, geocoder 135 populates the County attribute and the County Reference Point attribute with the Area ID and Reference point from the first query and populates the State attribute and the State Reference Point attribute with the Area ID and Reference point from the second query. Otherwise, geocoder 135 continues to query table 200 in a similar manner as the second query except geocoder 135 iterates to the next record in results of the first query and uses the value of the Parent ID from the record. In some embodiments, geocoder 135 implements the operations described as a single query on table 200.

Returning to FIG. 1, if geocoder 135 determines that the number of location data attributes is more than one and that the levels of the location data attributes are not adjacent to each other, geocoder 135 queries the shape data stored in shapes storage 150 for shapes associated with the location data in a manner described by the following example. Once geocoder 135 geo-enriches the location data, geocoder sends the geo-enriched location data to geo-enrichment manager 130.

An example geo-enrichment operation for location data with two non-adjacent attributes will now be described by reference to FIGS. 7 and 8. FIG. 7 illustrates example data 700 that includes area-based location data with two non-adjacent attributes according to some embodiments. As shown data 700 includes an ID attribute for storing an identifier for identifying a data record in data 500, a MyCountry attribute for storing a name of a geographical country region, and a MyCounty attribute for storing a name of a county in the geographical state region. Data 500 also includes four data records: a first data record that specifies a country of USA and a county of Collier, a second data record that specifies a country of USA and a county of Orange, a third data record that specifies a country of USA and a county of Palm Beach, and a fourth data record that specifies a country of USA and a county of Santa Clara. In this example the request to geo-enrich data specifies the levels in the hierarchy associated with the MyCountry location data attribute and the MyCounty location data attribute are one and three, respectively, which correspond to the non-adjacent country and county levels in the hierarchy used for the shape data in table 200.

Figure 8:
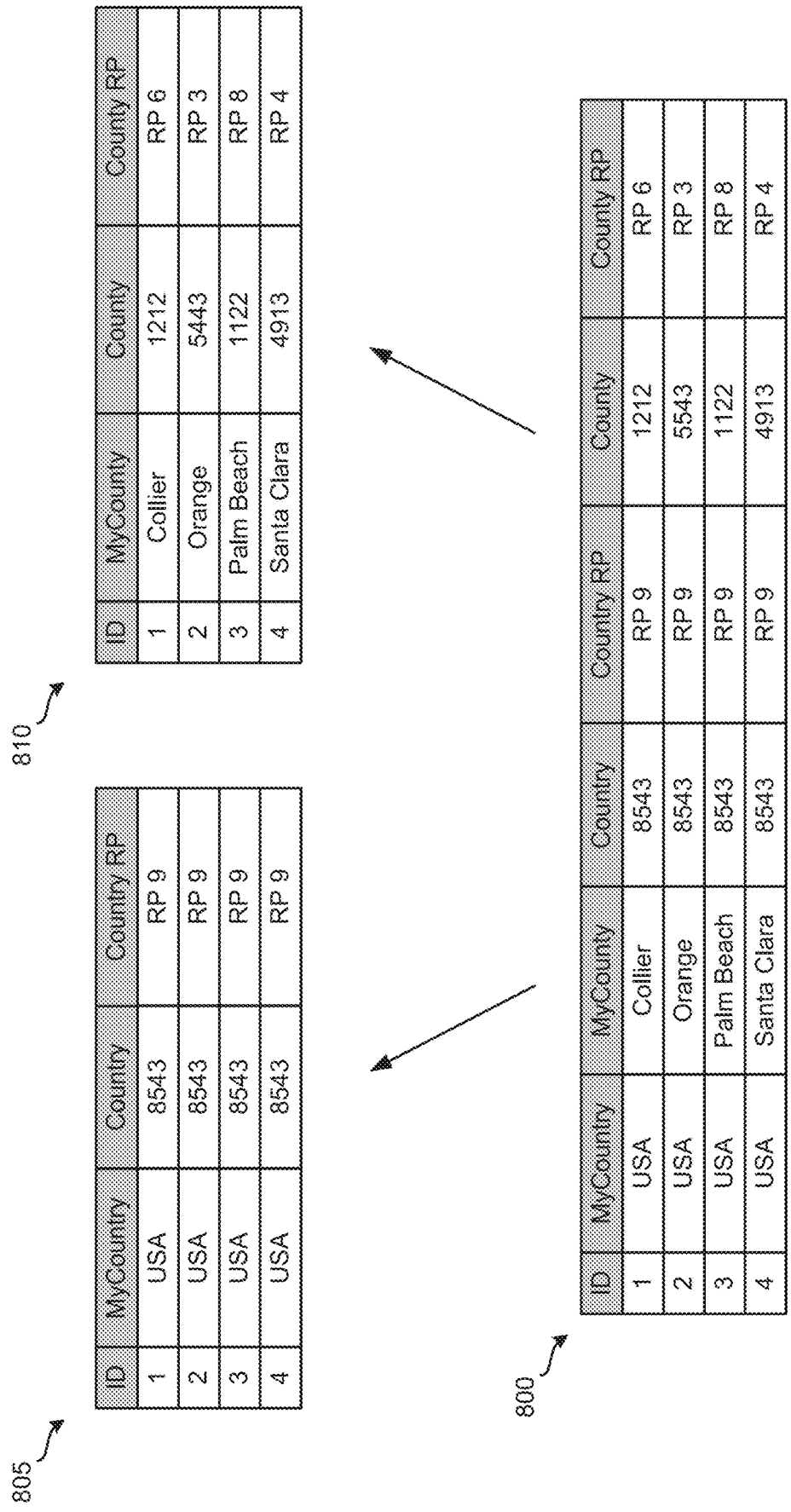
FIG. 8 illustrates geo-enrichment of the data illustrated in FIG. 7 based on shapes according to some embodiments.

FIG. 8 illustrates geo-enrichment of the data illustrated in FIG. 7 based on shapes according to some embodiments. As shown, FIG. 8 illustrates table 800, view 805, and view 810. Views 805 and 810 may be part of a data model. As illustrated, Table 800 includes the ID attribute, the MyCountry attribute, and the MyCounty attribute shown in data 700. In addition, table 800 includes a Country attribute for storing an area ID of a shape associated with a geographical country region, a Country Reference Point attribute for storing a point in the shape associated with the geographical country region, a County attribute for storing an area ID of a shape associated with a geographical county region, and a County Reference Point attribute for storing a point in the shape associated with the geographical county region. View 805 is a filter associated with table 800 that provides access to the MyCountry, the Country, and the Country Reference Point attributes in table 800. View 810 is a filter associated with table 800 that provides access to the MyCounty, the County, and the County Reference Point attributes in table 800.

For this example, geocoder 135 geo-enriches a data record of data 700 by performing a first query for the Area ID, the Parent Area ID, and the Reference Point from table 200 where the value of the Area Name attribute in table 200 and the value of the MyCounty attribute of the data record are the same or similar and where the value of the Level attribute in table 200 is three. Then, geocoder 135 performs a second query for the Area ID and the Parent Area ID from table 200 where the value of the Area ID attribute in table 200 and the value of the Parent ID from a record in the results of the first query are the same, and where the value of the Level attribute in table 200 is two. Next, geocoder 135 performs a third query for the Area ID, the Parent Area ID, and the Reference Point from table 200 where the value of the Area Name attribute in table 200 and the value of the MyState attribute of the data record are the same or similar, where the value of the Area ID attribute in table 200 and the value of the Parent ID from a record in the results of the second query are the same, and where the value of the Level attribute in table 200 is one. If the third query returns results that are not empty or null, geocoder 135 populates the County attribute and the County Reference Point attribute with the Area ID and Reference point from the first query and populates the Country attribute and the Country Reference Point attribute with the Area ID and Reference point from the third query. Otherwise, geocoder 135 continues to query table 200 in a similar manner as the second and third queries except geocoder 135 iterates to the next record in results of the first query and uses the value of the Parent ID from the record. In some embodiments, geocoder 135 implements the operations described as a single query on table 200.

Query processor 140 processes queries received from geo-enrichment manager 130. For example, when query processor 140 receives a query (e.g., a structured query language (SQL) query) for geo-enriched data, query processor 140 accesses geo-enriched data storage 145 and shapes storage 150. Then query processor 140 identifies geo-enriched data specified in the query and shapes associated with the geo-enriched data. Referring to FIGS. 2 and 4 as an example, query processor may access view 405 in geo-enriched data storage 145 to identify data records specified in the query, access table 200 in shapes storage 150, and then perform a join operation on the State attribute of the identified geo-enriched data and the Area ID attribute of table 200. Query processor 140 then generates a set of result for the query based on the identified data. Query processor 140 sends the set of results to geo-enrichment manager 130.

In some embodiments, query processor 140 can be configured to perform spatial operations on data that includes spatial data (e.g., geo-enriched data). For example, query processor 140 may receive from geo-enrichment manager 130 a shape associated with a geographical region, geo-enriched data, and a query for a subset of the geo-enriched data associated with the shape. In some embodiments, spatial query processor 140 determines the subset of the geo-enriched data associated with a shape by performing a spatial join operation between the geometry of the shape and the spatial data of the geo-enriched data. A spatial join operation compares, in some embodiments, a first set of spatial data with a second set of spatial data and identifies spatial data in the second set of spatial data that satisfy a type of spatial relationship with spatial data in the first set of spatial data. Example types of spatial relationships include a first spatial data contains a second spatial data, a first spatial data intersects a second spatial data, a first spatial data covers a second spatial data, a first spatial data is within a specified distance of a second spatial data, etc. For example, a distance spatial join operation may compare a first set of spatial data with a second set of spatial data and identify spatial data in the second set of spatial data that is within a specified distance of the first set of spatial data. If the first set of spatial data includes a polygon, the second set of spatial data includes a set of points (e.g., reference points of shapes), and the distance spatial operation specifies a distance of less than or equal to zero, then such a distance spatial join operation returns points in the set of points that are on or within the polygon. Once spatial query processor 140 performs a spatial join operation between the shape and the geo-enriched data to determine the subset of the geo-enriched data, spatial query processor 140 sends geo-enrichment manager 130 the determined subset of geo-enriched data.

Figure 9:
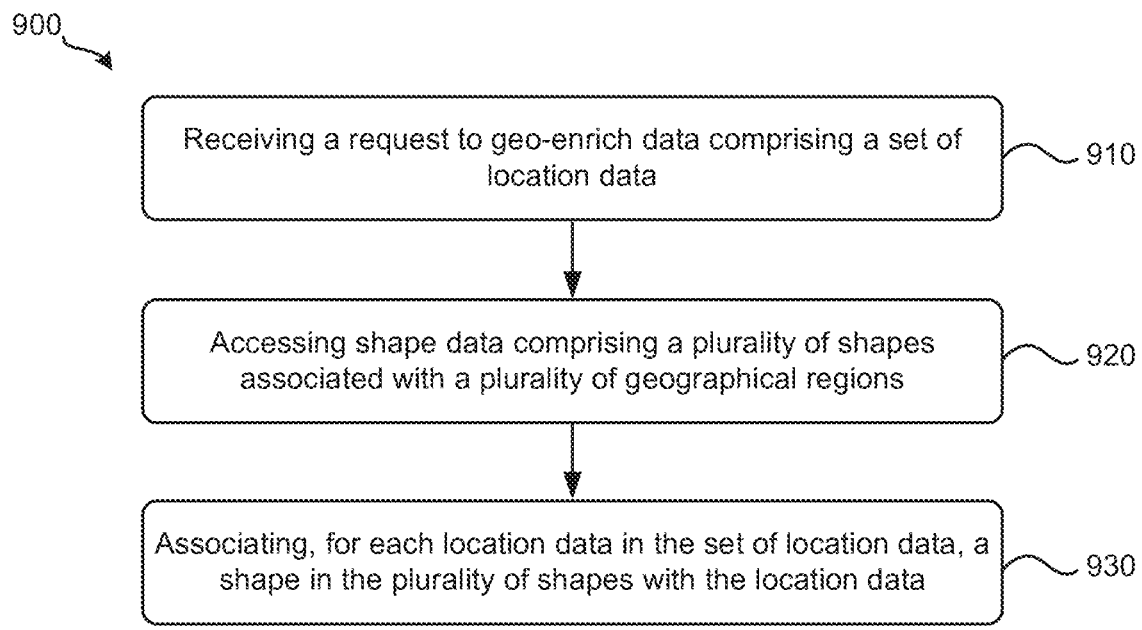
FIG. 9 illustrates a process for geo-enriching data based on shapes according to some embodiments.

FIG. 9 illustrates a process 900 for geo-enriching data based on shapes according to some embodiments. In some embodiments, geocoder 135 performs process 900. Process 900 starts by receiving, at 910, a request to geo-enrich data comprising a set of location data. Referring to FIGS. 1 and 3 as an example, geocoder 135 receives data 300 from geo-enrichment manager 130. Next, process 900 accesses, at 920, shape data comprising a plurality of shapes associated with a plurality of geographical regions. Referring to FIGS. 1 and 2 as an example, geocoder 135 accesses table 200 stored in shapes storage 150.

Finally, process 900, associates, at 930, for each location data in the set of location data, a shape in the plurality of shapes with the location data. Referring to FIGS. 1-4 as an example, geocoder 135 geo-enriches a data record of data 300 by querying for the Area ID and Reference Point from table 200 where the value of the Area Name attribute in table 200 and the value of the MyState attribute of the data record are the same and where the value of the Level attribute in table 200 is two.

Returning to FIG. 1, client device 105 is configured to generate and display visualizations on a display of client device 105. In addition, client device 105 is configure to access and communicate with geo-enriching system 125 (e.g., via a network) in order to obtain data for the visualizations. As shown, client device 105 includes visualization manager 110, data manager 115, and query manager 120. In some embodiments, visualization manager 110, data manager 115, and query manager 120 may be implemented in an application (e.g., a web browser) operating on client device 105.

Visualization manager 110 is responsible for managing visualizations for client device 105. For instance, visualization manager 110 may receive (e.g., from a user of client device 105) a request for a visualization that includes data (e.g., geo-enriched data) from a data model. Upon receiving to a request for a visualization that includes data from a data model, visualization manager 110 sends data manager 115 a request for data from the data model. In return, visualization manager 110 receives from data manager 115 the data from the data model. Then, visualization manager 110 generates the visualization to include data from the data model and displays it on the display of client device 105. Visualization manager 110 can receive from data manager 115 updates to data used in visualizations. When visualization manager 110 receives an update to data used in a visualization, visualization manager 110 generates the visualization to include the updated data and displays it on the display of client device 105.

Figures 10, 11:
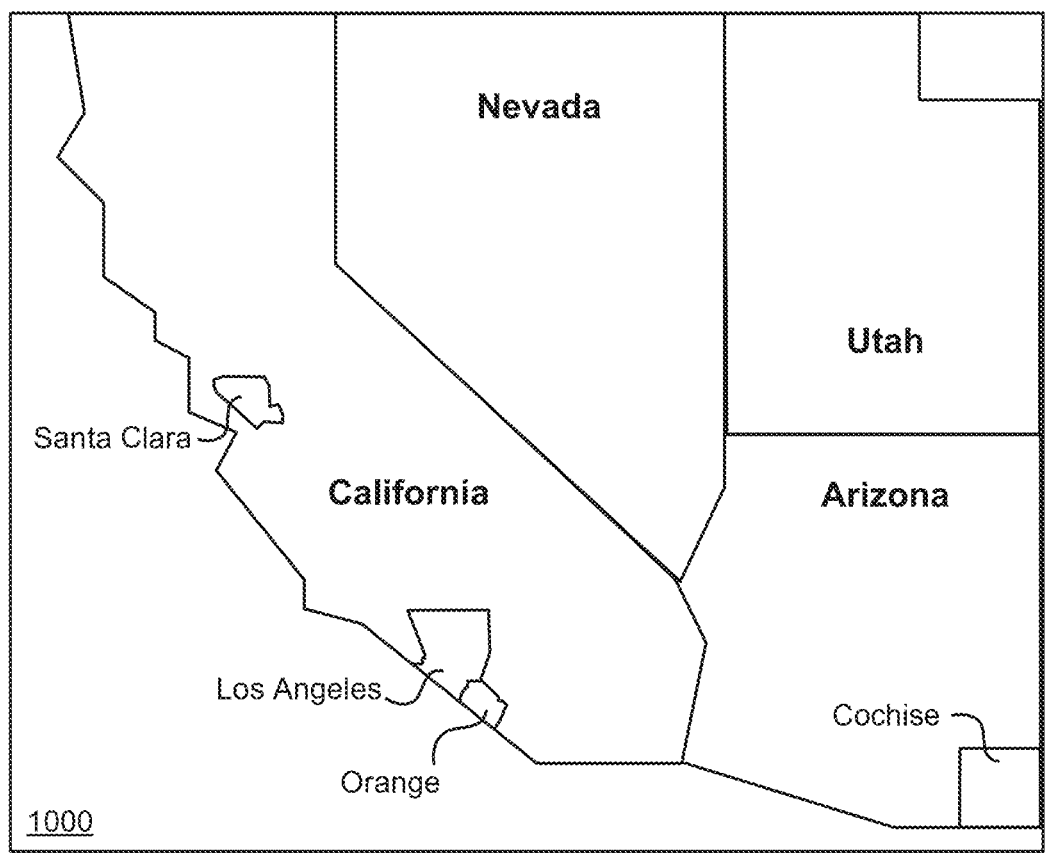
FIG. 10 illustrates an example map visualization that includes geo-enriched data according to some embodiments.
FIG. 11 illustrates an example chart visualization according to some embodiments.

Visualization manager 110 can generate different types of visualizations that include geo-enriched data. For example, visualization manager 110 may generate a map visualization that includes geo-enriched data. FIG. 10 illustrates an example map visualization 1000 that includes geo-enriched data according to some embodiments. For this example, map visualization 1000 includes the geographical county regions that include stores in the states of California, Nevada, Utah, and Arizona. As shown, the California counties of Santa Clara County, Los Angeles County, and Orange County have stores. The Arizona county of Cochise County has stores. As another example, visualization manager 110 can generate a chart visualization that includes geo-enriched data. FIG. 11 illustrates an example chart visualization 1100 that includes geo-enriched data according to some embodiments. As shown, chart visualization 1100 includes the store sales value associated with each of the counties illustrated in FIG. 10. Specifically, Santa Clara County has a store sales value of 34564, Los Angeles County has a store sales value of 67544, Orange County has a store sales value of 27349, and Cochise County has a store sales value of 11834.

In some embodiments, the geo-enriched data used in different visualizations is data from the same data model. As explained above, a data model may be defined as one or more views and one or more tables associated with the one or more views. For instance, the geo-enriched data used for map visualization 1000 and chart visualization 1100 may be from the same data model. In some embodiments, a user of client device 105 may specify that different visualizations using the geo-enriched data from the same data model are associated/linked to each other. FIGS. 10 and 11 illustrate an example of visualizations that are linked and that are using geo-enriched data from the same data model.

FIG. 10 shows an example of a spatial visualization that includes geo-enriched data while FIG. 11 shows an example of a non-spatial visualization that includes geo-enriched data. In some embodiments, visualization manager 110 generates and displays on a display of client device 105 one or more spatial visualizations (e.g., map visualization 1000) as well as and one or more non-spatial visualizations (e.g., chart visualization 1100). One of ordinary skill in the art will understand that visualization manager 110 may generate and display any number of additional and/or different spatial and/or non-spatial visualizations.

Data manager 115 is configured to manage data from data models used for visualizations. For example, data manager 115 may receive a request from visualization manager 110 for data from a data model. In response, data manager 115 generates a query for the data from the data model and sends the generated query to query manager 120. In return, data manager 115 receives the data from the data model and forwards it to visualization manager 110.

In some instances, a user of client device 105 may define and request to create a spatial filter for a visualization. In some such instances, data manager 115 receives the request to create a spatial filter and creates a spatial filter according to the definition of the spatial filter. In some embodiments, a spatial filter definition specifies a type of spatial filter, spatial parameters associated with the type of spatial filter, a defined space (e.g., an SRID of a defined space) in which the spatial filter is defined, and a spatial attribute on which the spatial filter is applied. After creating the spatial filter, data manager 115 generates a query for data from the data model used for the visualization that includes the spatial filter. Data manager 115 sends the query to query manager 120. In return, data manager 115 receives from query manager 120 data from the data model with the spatial filter applied. Data manager 115 then sends the filtered data to visualization manager 110 to update the visualization that includes data from the data model.

Figure 12:
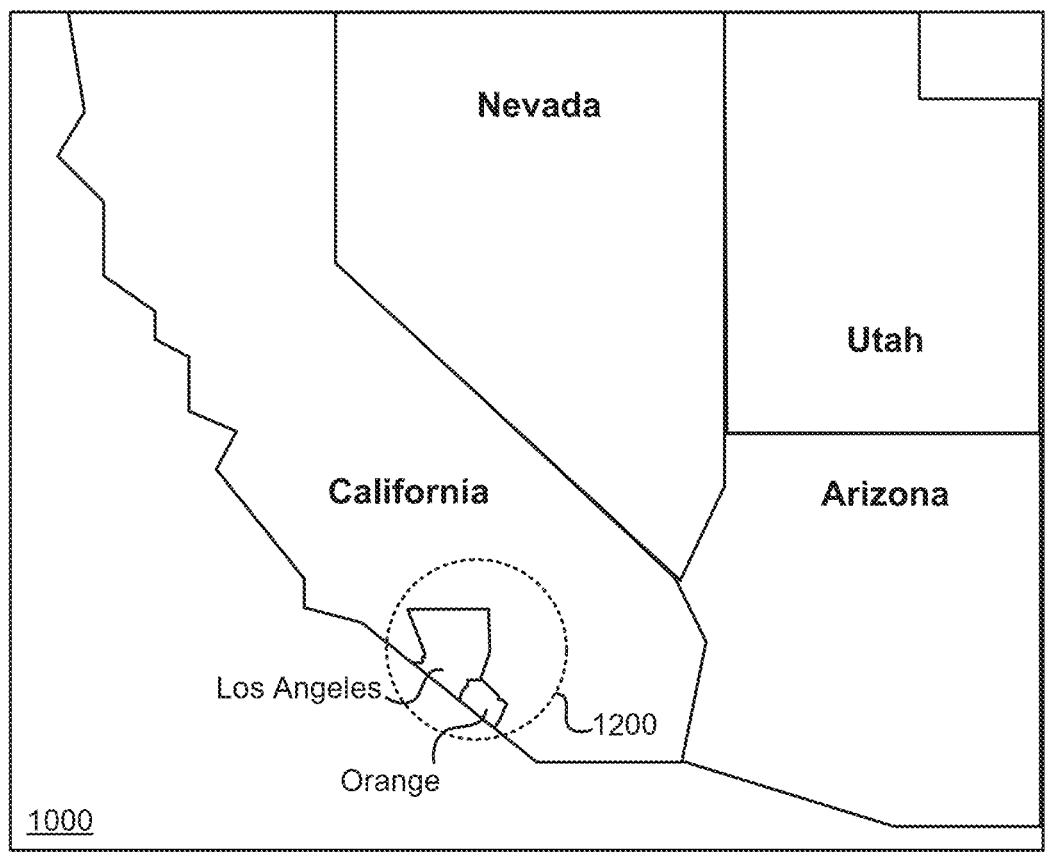
FIG. 12 illustrates an example map filter according to some embodiments.

Types of spatial filters may include a map filter and a location filter. A map filter filters for geo-enriched data based on a defined geometry. The spatial parameters associated with a map filter may include a geometry of a polygon. FIG. 12 illustrates an example map filter according to some embodiments. Specifically, FIG. 12 illustrates map filter 1200 applied to map visualization 1000 illustrated in FIG. 10. In this example, map filter 1200 is defined by a circular-shaped geometric shape. As shown, the geographic county regions that include stores (Los Angeles County and Orange County in this example) within map filter 1200 are included in map visualization 200. In some embodiments, a tool (not shown) included in map visualization 1000 is used to define map filter 1200. For this example, the query that data manager 115 generates specifies an intersection spatial operation between the geometry associated with map filter 1200 and the geo-enriched data included in map visualization 1000 illustrated in FIG. 10.

Figures 13, 14, 15:
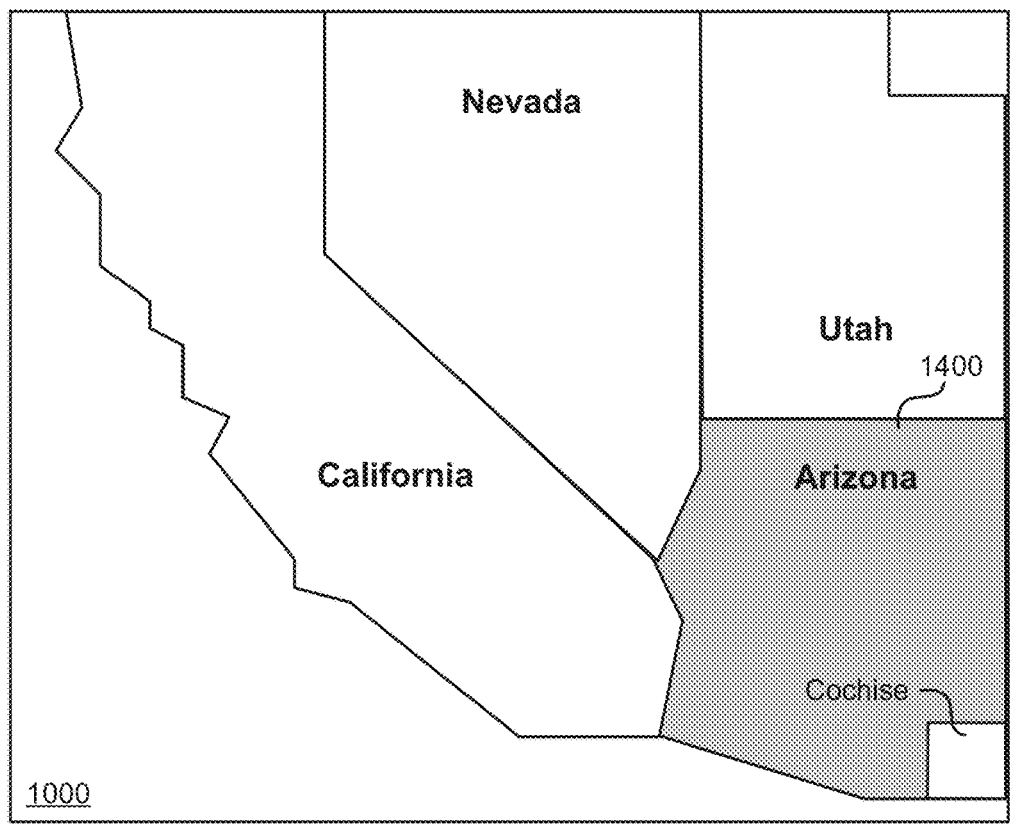
FIG. 13 illustrates an example location filter according to some embodiments.
FIG. 14 illustrates the chart visualization illustrated in FIG. 11 after the map filter illustrated in FIG. 12 is applied according to some embodiments.
FIG. 15 illustrates the chart visualization illustrated in FIG. 11 after the location filter illustrated in FIG. 13 is applied according to some embodiments.

A location filter filters for geo-enriched data based on a defined geographical element. The spatial parameters associated with a location filter may include a geometry of the defined geographical element. FIG. 13 illustrates an example location filter 1300 according to some embodiments. For this example, location filter 1300 is the defined state of Arizona as indicated by a gray shading of the state. As illustrated, the geographic county regions that include stores (Cochise in this example) within location filter 1300 are included in map visualization 1000. In this example, the query that data manager 115 generates specifies a distance spatial operation between the geometry associated with location filter 1300 and the reference points (e.g., values for the County Reference Point attribute) associated with the geo-enriched data included in map visualization 1000 illustrated in FIG where the distance is less than or equal to zero.

As described above, different visualizations using geo-enriched data from the same data model may be associated/linked to each other. When data manager 115 receives a spatial filter for one linked visualization, data manager 115 applies the spatial filter to the data used in the one linked visualization in the manner described above. Data manager 115 then applies the spatial filter to data used in the other linked visualization. Data manager 115 sends the filtered data to visualization manager 110 to update the other linked visualization. As explained above, FIGS. 10 and 11 illustrate an example of visualizations that are linked and that are using geo-enriched data from the same data model. FIG. 14 illustrates chart visualization 1100 after map filter 1200 is applied according to some embodiments. As shown, chart visualization 1100 includes the store sales value associated with each of the counties (Santa Clara County and Los Angeles County) illustrated in FIG. 12. FIG. 15 illustrates chart visualization 1100 after location filter 1300 is applied according to some embodiments. As shown, chart visualization 1100 includes the store sales value associated with the county (Cochise County) illustrated in FIG. 13.

Query manager 120 is responsible for handling queries for data from geo-enriching system 125. For example, query manager 120 may receive from data manager 115 a request for data from a data model. Upon receiving such a request, query manager 120 sends the query to geo-enriching system 125. In return, query manager 120 receives the data from the data model, which query manager 120 then forwards to data manager 115.

Figure 16:
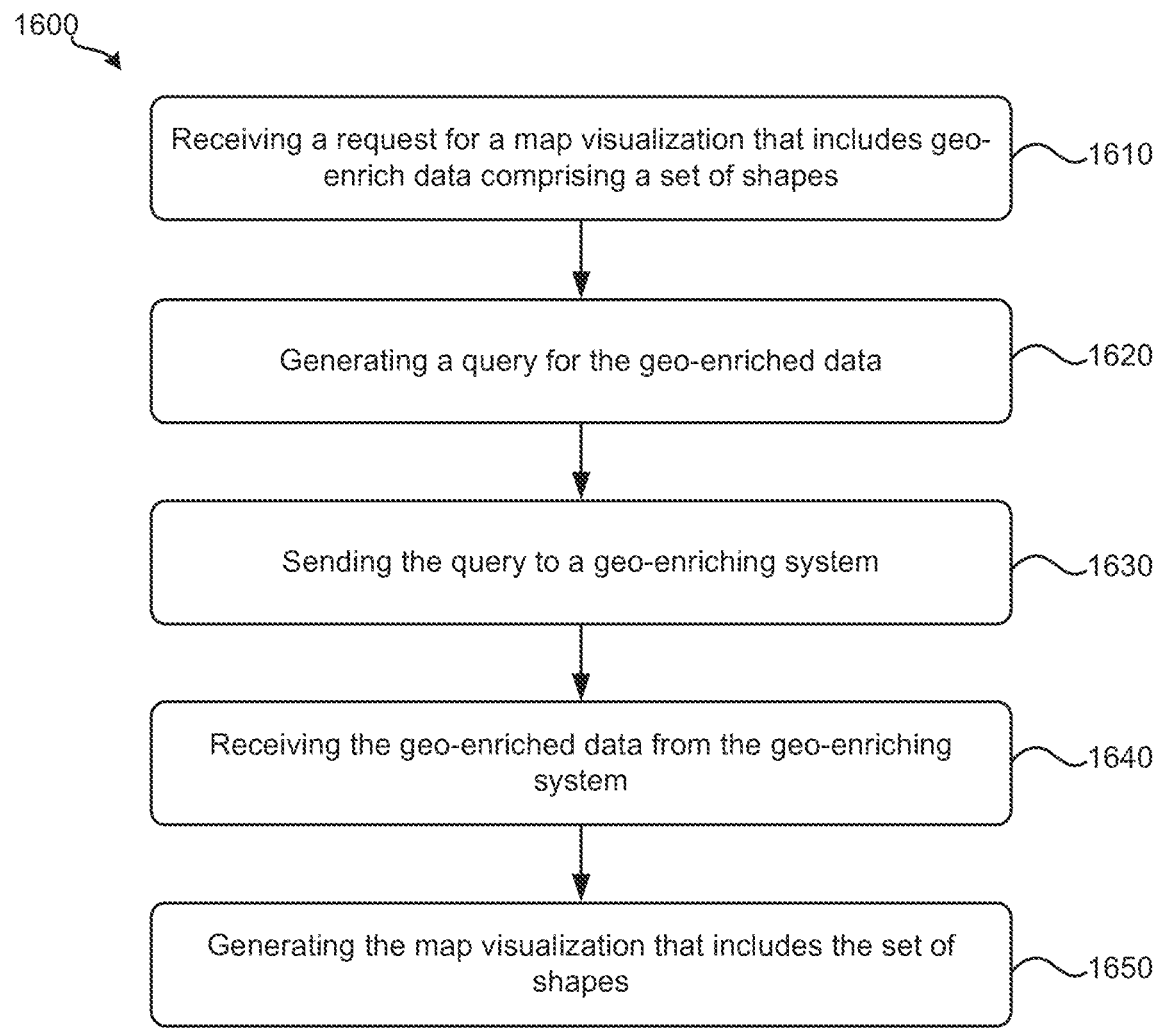
FIG. 16 illustrates a process for retrieving geo-enriching data that includes shapes according to some embodiments.

FIG. 16 illustrates a process 1600 for retrieving geo-enriching data that includes shapes according to some embodiments. In some embodiments, client device 105 perform process 1600. Process 1600 begins by receiving, at 1610, a request for a map visualization that includes geo-enriched data comprising a set of shapes. Referring to FIGS. 1 and 10 as an example, visualization manager 110 may receive a request for map visualization 1000 illustrated in FIG. 10 and then send the request to data manager 115.

Next, process 1600 generates, at 1620, a query for the geo-enriched data. Continuing with the above example, data manager 115 generates the query for the geo-enriched data from a data model and sends the generated query to query manager 120. The query for this example is for shapes of geographical county regions. Process 1600 then sends, at 1630, the query to a geo-enriching system. Continuing with the above example, query manager 120 sends the query to geo-enriching system 125. Next, process 1600 receives, at 1640, the geo-enriched data from the geo-enriching system. Continuing with the above example, query manager 120 receives the geo-enriched data from geo-enriching system 125. Finally, process 1600 generates, at 1650, the map visualization that includes the set of shapes. Continuing with the above example, FIG. 10 illustrates map visualization 1000 that includes the set of shapes of geographical county regions.

Figure 17:
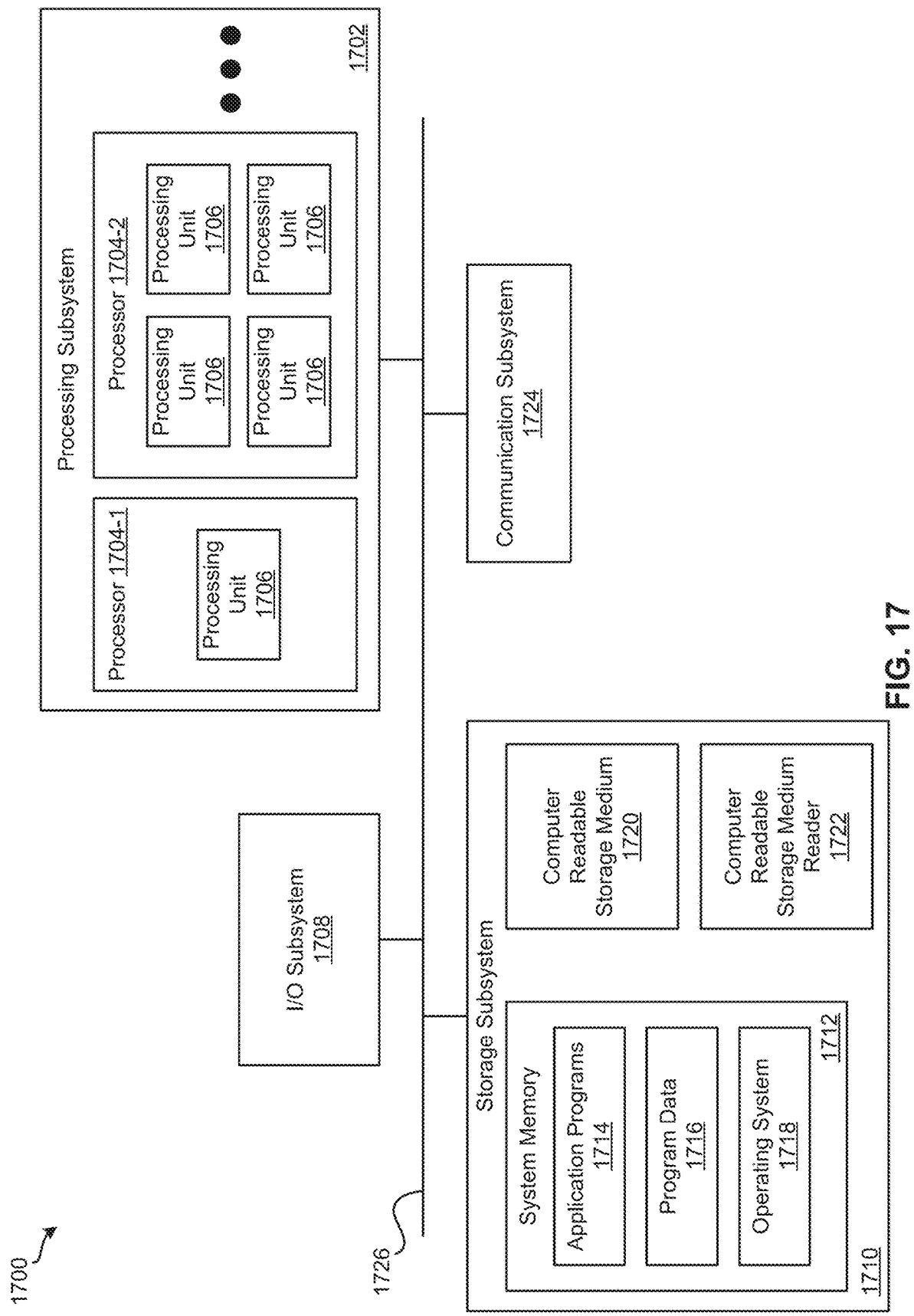
FIG. 17 illustrates an exemplary computer system for implementing various embodiments described above.

FIG. 17 illustrates an exemplary computer system 1700 for implementing various embodiments described above. For example, computer system 1700 may be used to implement client device 105 and geo-enriching system 125. Computer system 1700 may be a desktop computer, a laptop, a server computer, or any other type of computer system or combination thereof. Computer system 1700 can implement many of the operations, methods, and/or processes described above (e.g., process 900 and 1600). As shown in FIG. 17, computer system 1700 includes processing subsystem 1702, which communicates, via bus subsystem 1726, with input/output (I/O) subsystem 1708, storage subsystem 1710 and communication subsystem 1724.

Bus subsystem 1726 is configured to facilitate communication among the various components and subsystems of computer system 1700. While bus subsystem 1726 is illustrated in FIG. 17 as a single bus, one of ordinary skill in the art will understand that bus subsystem 1726 may be implemented as multiple buses. Bus subsystem 1726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1702, which can be implemented as one or more integrated circuits (e.g., a conventional microprocessor or microcontroller), controls the operation of computer system 1700. Processing subsystem 1702 may include one or more processors 1704. Each processor 1704 may include one processing unit 1706 (e.g., a single core processor such as processor 1704-1) or several processing units 1706 (e.g., a multicore processor such as processor 1704-2). In some embodiments, processors 1704 of processing subsystem 1702 may be implemented as independent processors while, in other embodiments, processors 1704 of processing subsystem 1702 may be implemented as multiple processors integrate into a single chip or multiple chips. Still, in some embodiments, processors 1704 of processing subsystem 1702 may be implemented as a combination of independent processors and multiple processors integrated into a single chip or multiple chips.

In some embodiments, processing subsystem 1702 can execute a variety of programs or processes in response to program code and can maintain multiple concurrently executing programs or processes. At any given time, some or all of the program code to be executed can reside in processing subsystem 1702 and/or in storage subsystem 1710. Through suitable programming, processing subsystem 1702 can provide various functionalities, such as the functionalities described above by reference to process 900, 1600, etc.

I/O subsystem 1708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1700 to a user or another device (e.g., a printer).

As illustrated in FIG. 17, storage subsystem 1710 includes system memory 1712, computer-readable storage medium 1720, and computer-readable storage medium reader 1722. System memory 1712 may be configured to store software in the form of program instructions that are loadable and executable by processing subsystem 1702 as well as data generated during the execution of program instructions. In some embodiments, system memory 1712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1712 may include different types of memory, such as static random access memory (SRAM) and/or dynamic random access memory (DRAM). System memory 1712 may include a basic input/output system (BIOS), in some embodiments, that is configured to store basic routines to facilitate transferring information between elements within computer system 1700 (e.g., during start-up). Such a BIOS may be stored in ROM (e.g., a ROM chip), flash memory, or any other type of memory that may be configured to store the BIOS.

As shown in FIG. 17, system memory 1712 includes application programs 1714, program data 1716, and operating system (OS) 1718. OS 1718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1720 may be a non-transitory computer-readable medium configured to store software (e.g., programs, code modules, data constructs, instructions, etc.). Many of the components (e.g., visualization manager 110, data manager 115, query manager 120, geo-enrichment manager 130, geocode 135, and query processor 140) and/or processes (e.g., process 900 and 1600) described above may be implemented as software that when executed by a processor or processing unit (e.g., a processor or processing unit of processing subsystem 1702) performs the operations of such components and/or processes. Storage subsystem 1710 may also store data used for, or generated during, the execution of the software.

Storage subsystem 1710 may also include computer-readable storage medium reader 1722 that is configured to communicate with computer-readable storage medium 1720. Together and, optionally, in combination with system memory 1712, computer-readable storage medium 1720 may comprehensively represent remote, local, fixed, and/or removable storage devices plus storage media for temporarily and/or more permanently containing, storing, transmitting, and retrieving computer-readable information.

Computer-readable storage medium 1720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1724 serves as an interface for receiving data from, and transmitting data to, other devices, computer systems, and networks. For example, communication subsystem 1724 may allow computer system 1700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1724 may provide components configured for wired communication (e.g., Ethernet) in addition to or instead of components configured for wireless communication.

One of ordinary skill in the art will realize that the architecture shown in FIG. 17 is only an example architecture of computer system 1700, and that computer system 1700 may have additional or fewer components than shown, or a different configuration of components. The various components shown in FIG. 17 may be implemented in hardware, software, firmware or any combination thereof, including one or more signal processing and/or application specific integrated circuits.

Figure 18:
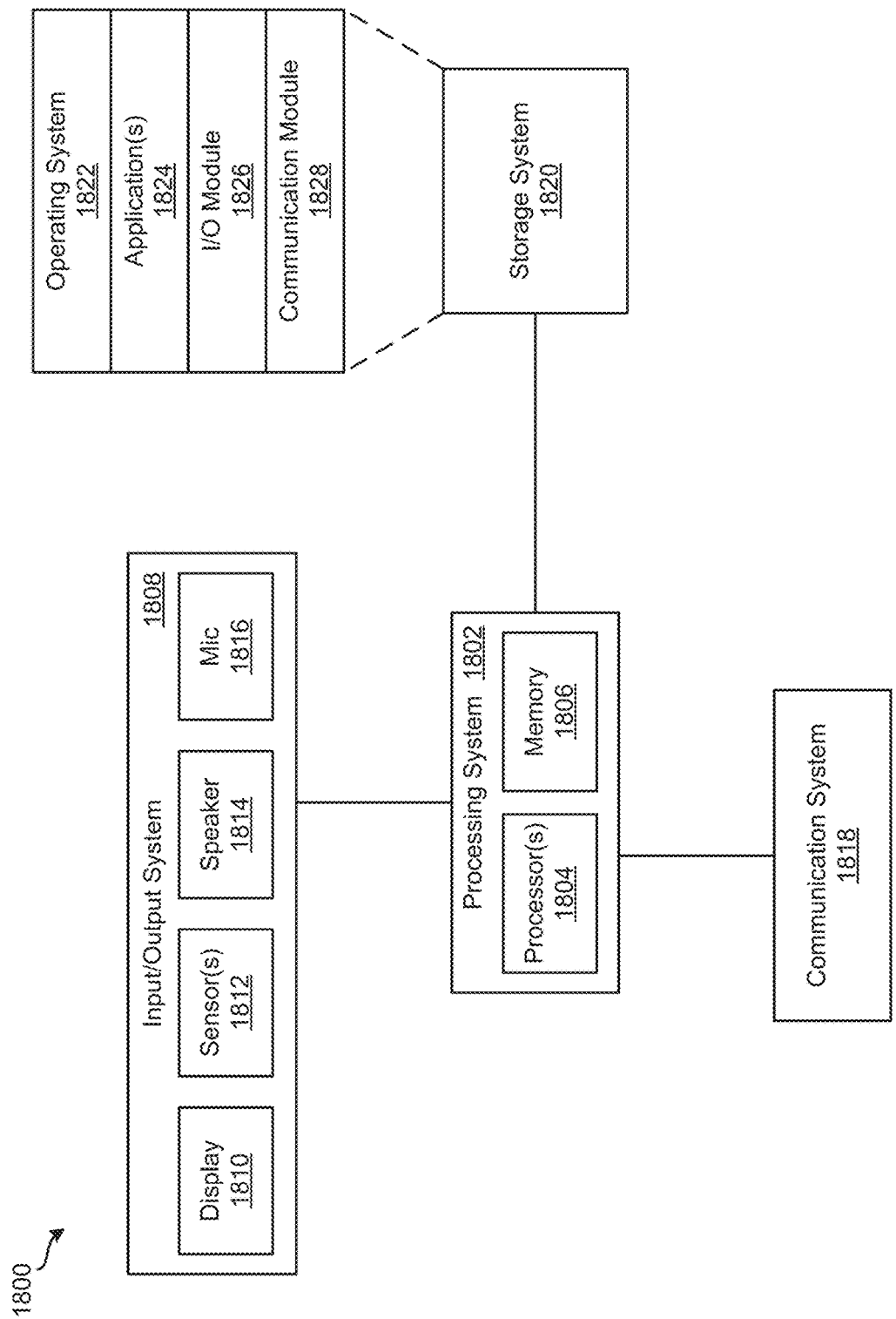
FIG. 18 illustrates an exemplary computing device for implementing various embodiments described above.

FIG. 18 illustrates an exemplary computing device 1800 for implementing various embodiments described above. For example, computing device 1800 may be used to implement client device 105. Computing device 1800 may be a cellphone, a smartphone, a wearable device, an activity tracker or manager, a tablet, a personal digital assistant (PDA), a media player, or any other type of mobile computing device or combination thereof. Computing device 1800 can implement many of the operations, methods, and/or processes described above (e.g., process 1600). As shown in FIG. 18, computing device 1800 includes processing system 1802, input/output (I/O) system 1808, communication system 1818, and storage system 1820. These components may be coupled by one or more communication buses or signal lines.

Processing system 1802, which can be implemented as one or more integrated circuits (e.g., a conventional microprocessor or microcontroller), controls the operation of computing device 1800. As shown, processing system 1802 includes one or more processors 1804 and memory 1806. Processors 1804 are configured to run or execute various software and/or sets of instructions stored in memory 1806 to perform various functions for computing device 1800 and to process data.

Each processor of processors 1804 may include one processing unit (e.g., a single core processor) or several processing units (e.g., a multicore processor). In some embodiments, processors 1804 of processing system 1802 may be implemented as independent processors while, in other embodiments, processors 1804 of processing system 1802 may be implemented as multiple processors integrate into a single chip. Still, in some embodiments, processors 1804 of processing system 1802 may be implemented as a combination of independent processors and multiple processors integrated into a single chip.

Memory 1806 may be configured to receive and store software (e.g., operating system 1822, applications 1824, I/O module 1826, communication module 1828, etc. from storage system 1820) in the form of program instructions that are loadable and executable by processors 1804 as well as data generated during the execution of program instructions. In some embodiments, memory 1806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1808 is responsible for receiving input through various components and providing output through various components. As shown for this example, I/O system 1808 includes display 1810, one or more sensors 1812, speaker 1814, and microphone 1816. Display 1810 is configured to output visual information (e.g., a graphical user interface (GUI) generated and/or rendered by processors 1804). In some embodiments, display 1810 is a touch screen that is configured to also receive touch-based input. Display 1810 may be implemented using liquid crystal display (LCD) technology, light-emitting diode (LED) technology, organic LED (OLED) technology, organic electro luminescence (OEL) technology, or any other type of display technologies.

Sensors 1812 may include any number of different types of sensors for measuring a physical quantity (e.g., temperature, force, pressure, acceleration, orientation, light, radiation, etc.). Speaker 1814 is configured to output audio information and microphone 1816 is configured to receive audio input. One of ordinary skill in the art will appreciate that I/O system 1808 may include any number of additional, fewer, and/or different components. For instance, I/O system 1808 may include a keypad or keyboard for receiving input, a port for transmitting data, receiving data and/or power, and/or communicating with another device or component, an image capture component for capturing photos and/or videos, etc.

Communication system 1818 serves as an interface for receiving data from, and transmitting data to, other devices, computer systems, and networks. For example, communication system 1818 may allow computing device 1800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1818 may provide components configured for wired communication (e.g., Ethernet) in addition to or instead of components configured for wireless communication.

Storage system 1820 handles the storage and management of data for computing device 1800. Storage system 1820 may be implemented by one or more non-transitory machine-readable mediums that are configured to store software (e.g., programs, code modules, data constructs, instructions, etc.) and store data used for, or generated during, the execution of the software. Many of the components (e.g., visualization manager 110, data manager 115, and query manager 120) and/or processes (e.g., process 1600) described above may be implemented as software that when executed by a processor or processing unit (e.g., processors 1804 of processing system 1802) performs the operations of such components and/or processes.

In this example, storage system 1820 includes operating system 1822, one or more applications 1824, I/O module 1826, and communication module 1828. Operating system 1822 includes various procedures, sets of instructions, software components and/or drivers for controlling and managing general system tasks (e.g., memory management, storage device control, power management, etc.) and facilitates communication between various hardware and software components. Operating system 1822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1824 can include any number of different applications installed on computing device 1800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1826 manages information received via input components (e.g., display 1810, sensors 1812, and microphone 1816) and information to be outputted via output components (e.g., display 1810 and speaker 1814). Communication module 1828 facilitates communication with other devices via communication system 1818 and includes various software components for handling data received from communication system 1818.

One of ordinary skill in the art will realize that the architecture shown in FIG. 18 is only an example architecture of computing device 1800, and that computing device 1800 may have additional or fewer components than shown, or a different configuration of components.

The various components shown in FIG. 18 may be implemented in hardware, software, firmware or any combination thereof, including one or more signal processing and/or application specific integrated circuits.

Figure 19:
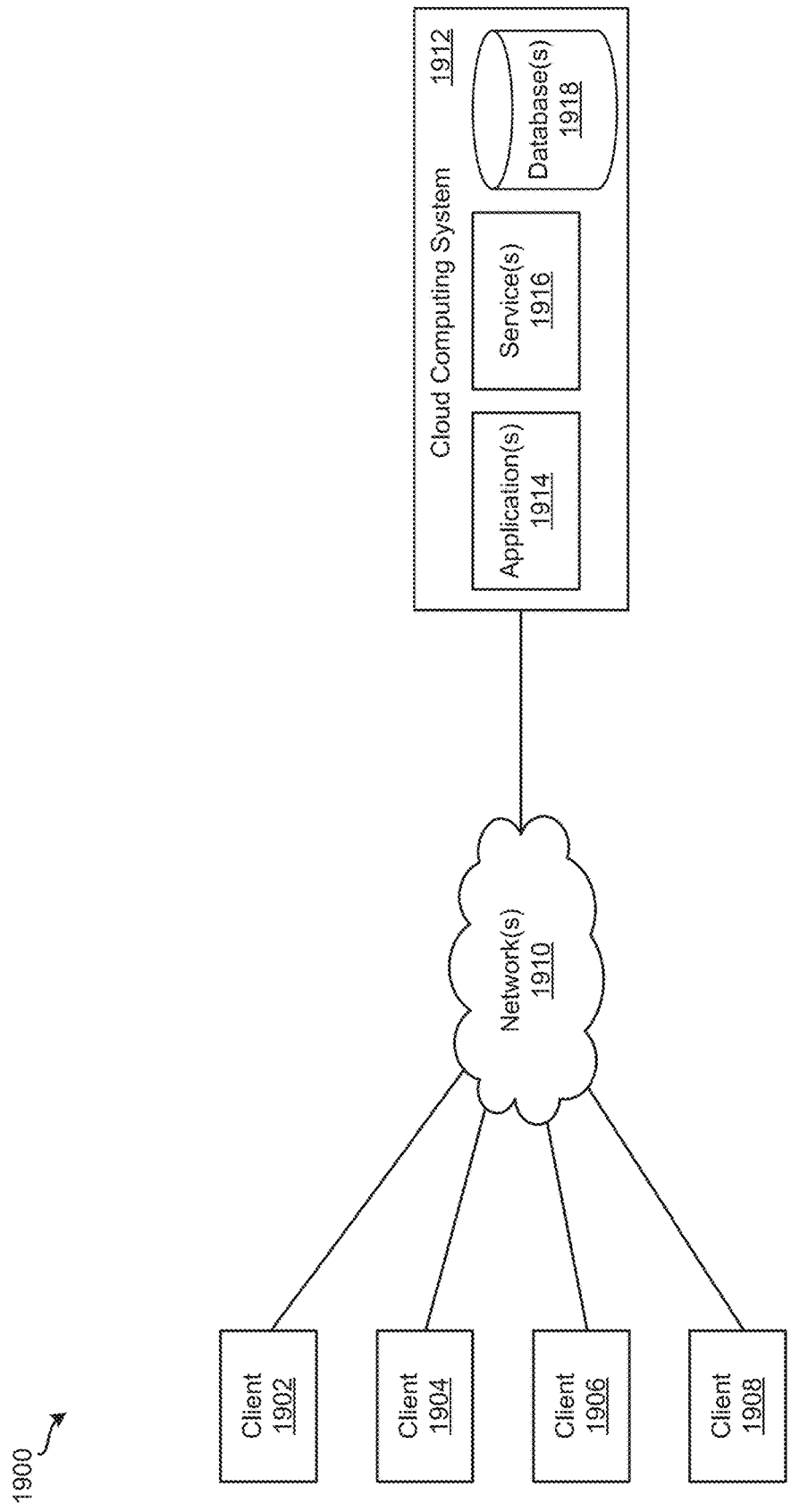
FIG. 19 illustrates an exemplary system for implementing various embodiments described above.

FIG. 19 illustrates an exemplary system 1900 for implementing various embodiments described above. For example, cloud computing system 1912 of system 1900 may be used to implement geo-enriching system 125 and one of client devices 1902-1908 of system 1900 may be used to implement client device 105. As shown, system 1900 includes client devices 1902-1908, one or more networks 1910, and cloud computing system 1912. Cloud computing system 1912 is configured to provide resources and data to client devices 1902-1908 via networks 1910. In some embodiments, cloud computing system 1900 provides resources to any number of different users (e.g., customers, tenants, organizations, etc.). Cloud computing system 1912 may be implemented by one or more computer systems (e.g., servers), virtual machines operating on a computer system, or a combination thereof.

As shown, cloud computing system 1912 includes one or more applications 1914, one or more services 1916, and one or more databases 1918. Cloud computing system 1900 may provide applications 1914, services 1916, and databases 1918 to any number of different customers in a self-service, subscription-based, elastically scalable, reliable, highly available, and secure manner.

In some embodiments, cloud computing system 1900 may be adapted to automatically provision, manage, and track a customer's subscriptions to services offered by cloud computing system 1900. Cloud computing system 1900 may provide cloud services via different deployment models. For example, cloud services may be provided under a public cloud model in which cloud computing system 1900 is owned by an organization selling cloud services and the cloud services are made available to the general public or different industry enterprises. As another example, cloud services may be provided under a private cloud model in which cloud computing system 1900 is operated solely for a single organization and may provide cloud services for one or more entities within the organization. The cloud services may also be provided under a community cloud model in which cloud computing system 1900 and the cloud services provided by cloud computing system 1900 are shared by several organizations in a related community. The cloud services may also be provided under a hybrid cloud model, which is a combination of two or more of the aforementioned different models.

In some instances, any one of applications 1914, services 1916, and databases 1918 made available to client devices 1902-1908 via networks 1910 from cloud computing system 1900 is referred to as a "cloud service." Typically, servers and systems that make up cloud computing system 1900 are different from the on-premises servers and systems of a customer. For example, cloud computing system 1900 may host an application and a user of one of client devices 1902-1908 may order and use the application via networks 1910.

Applications 1914 may include software applications that are configured to execute on cloud computing system 1912 (e.g., a computer system or a virtual machine operating on a computer system) and be accessed, controlled, managed, etc. via client devices 1902-1908. In some embodiments, applications 1914 may include server applications and/or mid-tier applications (e.g., HTTP (hypertext transport protocol) server applications, FTP (file transfer protocol) server applications, CGI (common gateway interface) server applications, JAVA server applications, etc.). Services 1916 are software components, modules, application, etc. that are configured to execute on cloud computing system 1912 and provide functionalities to client devices 1902-1908 via networks 1910. Services 1916 may be web-based services or on-demand cloud services.

Databases 1918 are configured to store and/or manage data that is accessed by applications 1914, services 1916, and/or client devices 1902-1908. For instance, storages 145 and 150 may be stored in databases 1918. Databases 1918 may reside on a non-transitory storage medium local to (and/or resident in) cloud computing system 1912, in a storage-area network (SAN), on a non-transitory storage medium local located remotely from cloud computing system 1912. In some embodiments, databases 1918 may include relational databases that are managed by a relational database management system (RDBMS). Databases 1918 may be a column-oriented databases, row-oriented databases, or a combination thereof. In some embodiments, some or all of databases 1918 are in-memory databases. That is, in some such embodiments, data for databases 1918 are stored and managed in memory (e.g., random access memory (RAM)).

Client devices 1902-1908 are configured to execute and operate a client application (e.g., a web browser, a proprietary client application, etc.) that communicates with applications 1914, services 1916, and/or databases 1918 via networks 1910. This way, client devices 1902-1908 may access the various functionalities provided by applications 1914, services 1916, and databases 1918 while applications 1914, services 1916, and databases 1918 are operating (e.g., hosted) on cloud computing system 1900. Client devices 1902-1908 may be computer system 1700 or computing device 1800, as described above by reference to FIGS. 17 and 18, respectively. Although system 1900 is shown with four client devices, any number of client devices may be supported.

Networks 1910 may be any type of network configured to facilitate data communications among client devices 1902-1908 and cloud computing system 1912 using any of a variety of network protocols. Networks 1910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processor of a computing device, the program comprising sets of instructions for:
   receiving, from a client device, a request to geo-enrich data comprising a set of location data, each location data in the set of location data comprising a location name, the request specifying a level in a plurality of levels of a hierarchy of shape data;
   accessing shape data comprising a plurality of shapes associated with a plurality of geographical regions, a unique identifier associated with each shape in the plurality of shapes, a name associated with a geographical region represented by each shape in the plurality of shapes, and a level in the plurality of levels of the hierarchy of shape data associated with each shape in the plurality of shapes;
   querying, for each location data in the set of location data, the shape data to identify a shape in the plurality of shapes having a name associated with a geographical region represented by the shape that matches the location name of the location data and having a level in the plurality of levels of the hierarchy of shape data that matches the level specified in the request; and
   associating, for each location data in the set of location data, the identified shape in the plurality of shapes with the location data.

2. The non-transitory machine-readable medium of claim 1, wherein the client device is a first client device, wherein the request is a first request, wherein the program further comprises sets of instructions for:
   receiving, from a second client device, a spatial filter and a second request for data in the geo-enriched data;
   in response to the second request, determining a subset of the geo-enriched data based on the spatial filter; and
   sending the subset of the geo-enriched data to the second client device.

3. The non-transitory machine-readable medium of claim 1, wherein the location name of each location data in the set of location data is a first location name, wherein each location data in the set of location data further comprises a second location name, wherein the level specified in the request is a first level for the first location names, wherein the request further specifies a second level in the plurality of levels of the hierarchy of shape data for the second location names, wherein the identified shape for each location in the set of locations is a first identified shape, wherein the associating comprises associating, for each location data in the set of location data, the first identified shape in the plurality of shapes with the first location name of the location data, wherein the program further comprises sets of instructions for:
   querying, for each location data in the set of location data, the shape data to identify a second shape in the plurality of shapes having a name associated with a geographical region represented by the shape that matches the second location name of the location data and having a level in the plurality of levels of the hierarchy of shape data that matches the second level specified in the request; and
   associating, for each location data in the set of location data, the second identified shape in the plurality of shapes with the second location name of the location data.

4. The non-transitory machine-readable medium of claim 3, wherein the program further comprises sets of instructions for:
   generating a first view that includes the first location name of the set of location data and the first identified shapes associated with the first location name of the set of location data; and
   generating a second view that includes the second location name of the set of location data and the second identified shapes associated with the second location name of the set of location data.

5. The non-transitory machine-readable medium of claim 1, wherein the shape data further comprises a parent identifier associated with each shape in the plurality of shapes for storing a unique identifier associated with a particular shape in the plurality of shapes that is a parent of the shape in the hierarchy of shape data.

6. The non-transitory machine-readable medium of claim 1, wherein the shape data further comprises a reference point associated with each shape in the plurality of shapes, wherein the program further comprises sets of instructions for:
   determining, for each shape in the plurality of shapes, the reference point associated with the shape by:
   calculating a centroid of the shape;
   using the centroid of the shape as the reference point associated with the shape upon determining that the centroid is contained in the shape; and
   using a point within the shape as the reference point associated with the shape upon determining that the centroid is not contained in the shape.

7. The non-transitory machine-readable medium of claim 6, wherein determining, for each shape in the plurality of shapes, the reference point associated with the shape by further, upon determining that the shape comprises a plurality of polygons, identifying a polygon in the plurality of polygons having a largest area, wherein calculating the centroid of the shape comprises calculating the centroid of the polygon, wherein using the centroid of the shape as the reference point associated with the shape comprises using the centroid of the shape as the reference point associated with the shape upon determining that the centroid is contained in the polygon, wherein using the point within the shape as the reference point associated with the shape comprises using the point within the shape as the reference point associated with the shape upon determining that the centroid is not contained in the polygon.

8. A method comprising:
   receiving, from a client device, a request to geo-enrich data comprising a set of location data, each location data in the set of location data comprising a location name, the request specifying a level in a plurality of levels of a hierarchy of shape data;
   accessing shape data comprising a plurality of shapes associated with a plurality of geographical regions, a unique identifier associated with each shape in the plurality of shapes, a name associated with a geographical region represented by each shape in the plurality of shapes, and a level in the plurality of levels of the hierarchy of shape data associated with each shape in the plurality of shapes;

querying, for each location data in the set of location data, the shape data to identify a shape in the plurality of shapes having a name associated with a geographical region represented by the shape that matches the location name of the location data and having a level in the plurality of levels of the hierarchy of shape data that matches the level specified in the request; and associating, for each location data in the set of location data, the identified shape in the plurality of shapes with the location data.

9. The method of claim 8, wherein the client device is a first client device, wherein the request is a first request, wherein the method further comprises:

receiving, from a second client device, a spatial filter and a second request for data in the geo-enriched data;

in response to the second request, determining a subset of the geo-enriched data based on the spatial filter; and sending the subset of the geo-enriched data to the second client device.

10. The method of claim 8, wherein the location name of each location data in the set of location data is a first location name, wherein each location data in the set of location data further comprises a second location name, wherein the level specified in the request is a first level for the first location names, wherein the request further specifies a second level in the plurality of levels of the hierarchy of shape data for the second location names, wherein the identified shape for each location in the set of locations is a first identified shape, wherein the associating comprises associating, for each location data in the set of location data, the first identified shape in the plurality of shapes with the first location name of the location data, wherein the method further comprises:

querying, for each location data in the set of location data, the shape data to identify a second shape in the plurality of shapes having a name associated with a geographical region represented by the shape that matches the second location name of the location data and having a level in the plurality of levels of the hierarchy of shape data that matches the second level specified in the request; and associating, for each location data in the set of location data, the second identified shape in the plurality of shapes with the second location name of the location data.

11. The method of claim 10 further comprising:

generating a first view that includes the first location name of the set of location data and the first identified shapes associated with the first location name of the set of location data; and generating a second view that includes the second location name of the set of location data and the second identified shapes associated with the second location name of the set of location data.

12. The method of claim 8, wherein the shape data further comprises a parent identifier associated with each shape in the plurality of shapes for storing a unique identifier associated with a particular shape in the plurality of shapes that is a parent of the shape in the hierarchy of shape data.

13. The method of claim 8, wherein the shape data further comprises a reference point associated with each shape in the plurality of shapes, the method further comprising:

determining, for each shape in the plurality of shapes, the reference point associated with the shape by:

calculating a centroid of the shape;

using the centroid of the shape as the reference point associated with the shape upon determining that the centroid is contained in the shape; and using a point within the shape as the reference point associated with the shape upon determining that the centroid is not contained in the shape.

14. The method of claim 13, wherein determining, for each shape in the plurality of shapes, the reference point associated with the shape by further, upon determining that the shape comprises a plurality of polygons, identifying a polygon in the plurality of polygons having a largest area, wherein calculating the centroid of the shape comprises calculating the centroid of the polygon, wherein using the centroid of the shape as the reference point associated with the shape comprises using the centroid of the shape as the reference point associated with the shape upon determining that the centroid is contained in the polygon, wherein using the point within the shape as the reference point associated with the shape comprises using the point within the shape as the reference point associated with the shape upon determining that the centroid is not contained in the polygon.

15. A system comprising:

a set of processors; and a non-transitory computer-readable medium storing instructions that when executed by at least one processor in the set of processors cause the at least one processor to:

receive, from a client device, a request to geo-enrich data comprising a set of location data, each location data in the set of location data comprising a location name, the request specifying a level in a plurality of levels of a hierarchy of shape data;

access shape data comprising a plurality of shapes associated with a plurality of geographical regions, a unique identifier associated with each shape in the plurality of shapes, a name associated with a geographical region represented by each shape in the plurality of shapes, and a level in the plurality of levels of the hierarchy of shape data associated with each shape in the plurality of shapes;

query, for each location data in the set of location data, the shape data to identify a shape in the plurality of shapes having a name associated with a geographical region represented by the shape that matches the location name of the location data and having a level in the plurality of levels of the hierarchy of shape data that matches the level specified in the request; and associate, for each location data in the set of location data, the identified shape in the plurality of shapes with the location data.

16. The system of claim 15, wherein the client device is a first client device, wherein the request is a first request, wherein the instructions further cause the at least one processor to:

receive, from a second client device, a spatial filter and a second request for data in the geo-enriched data;

in response to the second request, determine a subset of the geo-enriched data based on the spatial filter; and send the subset of the geo-enriched data to the second client device.

17. The system of claim 15, wherein the location name of each location data in the set of location data is a first location name, wherein each location data in the set of location data further comprises a second location name, wherein the level specified in the request is a first level for the first location names, wherein the request further specifies a second level in the plurality of levels of the hierarchy of shape data for the second location names, wherein the identified shape for each location in the set of locations is a first identified shape, wherein the associating comprises associating, for each location data in the set of location data, the first identified shape in the plurality of shapes with the first location name of the location data, wherein the instructions further cause the at least one processor to:

query, for each location data in the set of location data, the shape data to identify a second shape in the plurality of shapes having a name associated with a geographical region represented by the shape that matches the second location name of the location data and having a level in the plurality of levels of the hierarchy of shape data that matches the second level specified in the request; and associate, for each location data in the set of location data, the second identified shape in the plurality of shapes with the second location name of the location data.

18. The system of claim 17, wherein the instructions further cause the at least one processor to:

generate a first view that includes the first location name of the set of location data and the first identified shapes associated with the first location name of the set of location data; and generate a second view that includes the second location of the set of location data and the second identified shapes associated with the second location name of the set of location data.

19. The system of claim 15, wherein the shape data further comprises a reference point associated with each shape in the plurality of shapes, wherein the instructions further cause the at least one processor to:

determine, for each shape in the plurality of shapes, the reference point associated with the shape by:

calculating a centroid of the shape;

using the centroid of the shape as the reference point associated with the shape upon determining that the centroid is contained in the shape; and using a point within the shape as the reference point associated with the shape upon determining that the centroid is not contained in the shape.

20. The system of claim 19, wherein determining, for each shape in the plurality of shapes, the reference point associated with the shape by further, upon determining that the shape comprises a plurality of polygons, identifying a polygon in the plurality of polygons having a largest area, wherein calculating the centroid of the shape comprises calculating the centroid of the polygon, wherein using the centroid of the shape as the reference point associated with the shape comprises using the centroid of the shape as the reference point associated with the shape upon determining that the centroid is contained in the polygon, wherein using the point within the shape as the reference point associated with the shape comprises using the point within the shape as the reference point associated with the shape upon determining that the centroid is not contained in the polygon.

* * * * *